US011644443B2

(12) United States Patent
Georgeson et al.

(10) Patent No.: US 11,644,443 B2
(45) Date of Patent: May 9, 2023

(54) LASER ULTRASOUND IMAGING

(71) Applicant: The Boeing Company, Chicago, IL (US)

(72) Inventors: Gary E. Georgeson, Tacoma, WA (US); Jeong-Beom Ihn, Seattle, WA (US); William P. Motzer, Seattle, WA (US); Jill P. Bingham, Seattle, WA (US)

(73) Assignee: The Boeing Company, Chicago, IL (US)

( * ) Notice: Subject to any disclaimer, the term of this patent is extended or adjusted under 35 U.S.C. 154(b) by 430 days.

(21) Appl. No.: 16/222,489

(22) Filed: Dec. 17, 2018

(65) Prior Publication Data
US 2020/0191749 A1    Jun. 18, 2020

(51) Int. Cl.
*G01N 29/06* (2006.01)
*G01N 29/04* (2006.01)
*G01N 29/24* (2006.01)

(52) U.S. Cl.
CPC ......... *G01N 29/069* (2013.01); *G01N 29/043* (2013.01); *G01N 29/2418* (2013.01); *G01N 2291/0231* (2013.01)

(58) Field of Classification Search
CPC ...... G01N 29/00; G01N 29/04; G01N 29/043; G01N 29/06; G01N 29/069; G01N 29/24–28; G01N 29/2418
See application file for complete search history.

(56) References Cited

U.S. PATENT DOCUMENTS 4,299,128 A * 11/1981 Gruber .................. G01N 29/07
73/627
5,475,613 A * 12/1995 Itoga ...................... G01S 15/86
702/39

(Continued)

FOREIGN PATENT DOCUMENTS

EP        0100094 A2 *  2/1984   ......... G01S 15/8979
EP        1 742 049       1/2007

(Continued)

OTHER PUBLICATIONS

Title: "How To Separate Colors For Positive And Negative Bars In Column/Bar Chart?"; URL: https://www.extendoffice.com/documents/excel/2218-excel-chart-negative-values-different-color.html (Year: 2014).*

(Continued)

*Primary Examiner* — Nguyen Q. Ha
(74) *Attorney, Agent, or Firm* — McDonnell Boehnen Hulbert & Berghoff LLP

(57) ABSTRACT

Described herein is a system for determining structural characteristics of an object, the system including a first laser, a second laser, one or more processors, and a computer readable medium storing instructions that, when executed by the one or more processors, cause the system to perform functions. The functions include illuminating, by the first laser, a surface region of an object with an incident light pulse, thereby causing the object to exhibit vibrations; illuminating, by the second laser, the surface region with an incident light beam, thereby generating responsive light that is indicative of the vibrations; detecting the responsive light and determining a difference between a characteristic of the responsive light and a reference characteristic that corresponds to the surface region; determining a position of the surface region within a three-dimensional space; and dis- (Continued)

playing the surface region such that the difference is indicated at the position of the surface region.

20 Claims, 10 Drawing Sheets

(56) References Cited

U.S. PATENT DOCUMENTS

| | | | | |
|---|---|---|---|---|
| 5,698,787 | A * | 12/1997 | Parzuchowski | G01N 29/2418 73/583 |
| 8,892,252 | B1 | 11/2014 | Troy et al. | |
| 2003/0101007 | A1* | 5/2003 | Dubois | G01N 29/0645 702/39 |
| 2004/0089811 | A1* | 5/2004 | Lewis | G01N 29/2418 250/341.6 |
| 2004/0218715 | A1* | 11/2004 | Jones | G01N 33/2045 378/57 |
| 2008/0137105 | A1* | 6/2008 | Howard | G01N 29/228 356/630 |
| 2008/0291466 | A1* | 11/2008 | Schuessler | G01H 9/00 356/502 |
| 2015/0185128 | A1* | 7/2015 | Chang | B64F 5/60 702/35 |
| 2017/0030864 | A1* | 2/2017 | Georgeson | G01N 29/11 |
| 2017/0286854 | A1* | 10/2017 | Ardis | G06F 11/3447 |
| 2018/0356205 | A1* | 12/2018 | Hatahori | G01N 21/45 |
| 2019/0323997 | A1* | 10/2019 | Nishimura | G01N 29/07 |
| 2019/0331757 | A1* | 10/2019 | Motzer | G01N 29/2418 |

FOREIGN PATENT DOCUMENTS

| | | | | |
|---|---|---|---|---|
| EP | 1742049 | A2 | 1/2007 | |
| EP | 3 153 452 | | 4/2017 | |
| WO | WO-9218862 | A1 * | 10/1992 | ......... G01N 29/0609 |
| WO | WO 2007/003058 | | 1/2007 | |
| WO | WO-2008103209 | A1 * | 8/2008 | ......... G01N 21/1702 |

OTHER PUBLICATIONS

Title: "Chapter 4. Color Scales"; Date: Oct. 23, 2018; URL: https://www.oreilly.com/library/view/fundamentals-of-data/9781492031079/ch04.html (Year: 2018).*
Extended European Search Report prepared by the European Patent Office in application No. EP 19 212 662.1 dated Apr. 21, 2020.

* cited by examiner

```
┌─────────────────────────────────────────────────────────┐
│  DETERMINING POSITION OF RANGEFINDER OR ORIENTATION OF  │
│                       RANGEFINDER                       │
└─────────────────────────────────────────────────────────┘
  302─┘                        │
                               ▼
┌─────────────────────────────────────────────────────────┐
│  DETERMINING DISTANCE BETWEEN RANGEFINDER AND SURFACE   │
│                         REGION                          │
└─────────────────────────────────────────────────────────┘
  304─┘
```

FIG. 8    ↖ 300

```
┌─────────────────────────────────────────────────────────┐
│   DETERMINING, BASED ON DIFFERENCE, THAT STRUCTURAL     │
│     DEFECT EXISTS UNDERNEATH SURFACE REGION             │
└─────────────────────────────────────────────────────────┘
  402─┘                        │
                               ▼
┌─────────────────────────────────────────────────────────┐
│    DISPLAYING STRUCTURAL DEFECT UNDERNEATH SURFACE      │
│                         REGION                          │
└─────────────────────────────────────────────────────────┘
  404─┘
```

FIG. 9    ↖ 400

LASER ULTRASOUND IMAGING

FIELD

The present disclosure generally relates to systems and methods for laser ultrasound imaging, and more specifically to systems and methods for using laser ultrasound techniques to generate and display an image of an object.

BACKGROUND

It is generally useful to inspect manufactured parts such as aircraft components before they are placed into service and throughout their service lifetimes to identify manufacturing defects, damage, or degradation that may arise while the component is in service. Such information can be used to predict how long a particular component can remain in service or whether the component should be replaced or repaired. This knowledge can reduce component replacement costs and costs of maintaining inventory. It can also be used to schedule and prioritize repairs or replacement of components.

A thorough evaluation of a component can involve analysis of multiple surfaces or interior locations of the component. However, current analysis techniques generally do not allow for detailed probing of a component both on and underneath its surface and generally do not allow for presenting such information in a three-dimensional manner. Thus, a need exists for systems and methods that better facilitate three-dimensional structural analysis of components and presentation of obtained information in three-dimensional space.

SUMMARY

One aspect of the disclosure is a method for determining structural characteristics of an object, the method comprising: illuminating, by a first laser, a surface region of an object with an incident light pulse, thereby causing the object to exhibit vibrations; illuminating, by a second laser, the surface region with an incident light beam, thereby generating responsive light that is indicative of the vibrations; detecting the responsive light and determining a difference between a characteristic of the responsive light and a reference characteristic that corresponds to the surface region; determining a position of the surface region within a three-dimensional space; and displaying the surface region such that the difference is indicated at the position of the surface region.

Another aspect of the disclosure is a non-transitory computer readable medium storing instructions that, when executed by a system for determining structural characteristics of an object, cause the system to perform functions comprising: illuminating, by a first laser, a surface region of an object with an incident light pulse, thereby causing the object to exhibit vibrations; illuminating, by a second laser, the surface region with an incident light beam, thereby generating responsive light that is indicative of the vibrations; detecting the responsive light and determining a difference between a characteristic of the responsive light and a reference characteristic that corresponds to the surface region; determining a position of the surface region within a three-dimensional space; and displaying the surface region such that the difference is indicated at the position of the surface region.

A further aspect of the disclosure is a system for determining structural characteristics of an object, the system comprising: a first laser; a second laser; one or more processors; and a computer readable medium storing instructions that, when executed by the one or more processors, cause the system to perform functions comprising: illuminating, by the first laser, a surface region of an object with an incident light pulse, thereby causing the object to exhibit vibrations; illuminating, by the second laser, the surface region with an incident light beam, thereby generating responsive light that is indicative of the vibrations; detecting the responsive light and determining a difference between a characteristic of the responsive light and a reference characteristic that corresponds to the surface region; determining a position of the surface region within a three-dimensional space; and displaying the surface region such that the difference is indicated at the position of the surface region.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 8 is a flow chart of a method, according to an example.

FIG. 9 is a flow chart of a method, according to an example.

DETAILED DESCRIPTION

Figure 1:
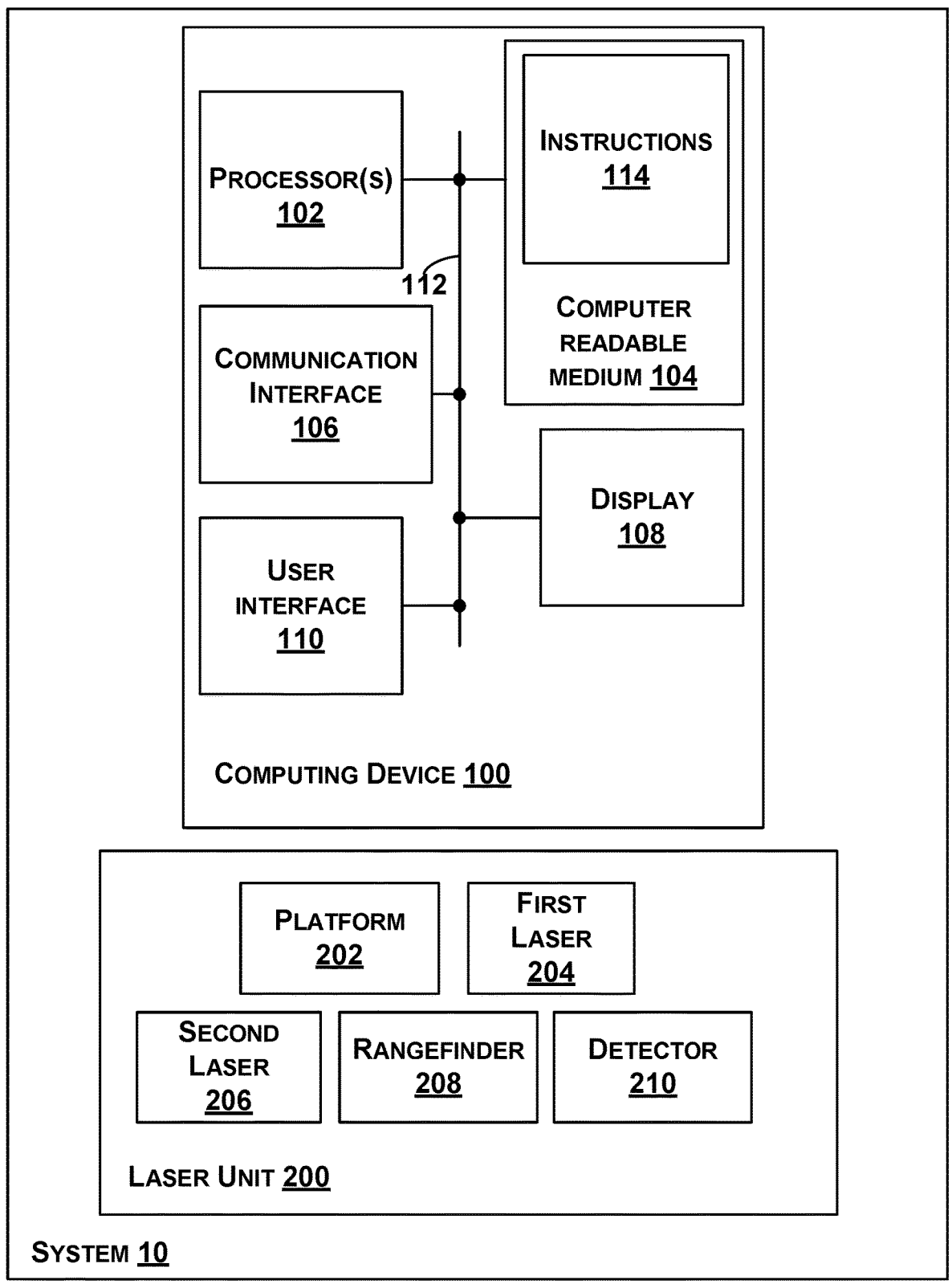
FIG. 1 is a schematic diagram of a system for determining structural characteristics of an object, according to an example.

As discussed above, there exists a need for systems and methods that better facilitate three-dimensional structural analysis of components and presentation of obtained information in three-dimensional space. Accordingly, this disclosure includes such systems and methods.

Within examples, a first laser illuminates a surface region of an object with an incident light pulse that is sufficiently powerful to cause the object (e.g., a component made of composite materials) to exhibit vibrations due to thermal expansion or ablation. The vibrations will generally begin at the surface region upon illumination by the incident light pulse, but the vibrations will also generally propagate into the object in a direction normal to the surface region. The vibrations will then typically reflect from discontinuities, defects, and/or a back surface of the object and return to the surface region.

A second laser illuminates the surface region with an incident light beam, which generates responsive light that is indicative of the vibrations caused by the incident light pulse. The incident light beam generally does not substantially disturb the object. Normally, the incident light beam of the second laser illuminates the object before, while, and after the incident light pulse of the first laser illuminates the object and causes the vibrations. Prior to illumination of the object by the incident light pulse, the responsive light generally has a waveform that is similar to that of the incident light beam, perhaps having an attenuated amplitude and a substantially constant phase difference when compared to the incident light beam. However, the vibrations caused by the incident light pulse will usually influence the responsive light in a detectable manner.

Thus, the responsive light that is indicative of the vibrations is detected (e.g., by a photodetector). Next, the system can determine a difference between a characteristic of the responsive light and a reference characteristic that corresponds to the surface region. For example, the reference characteristic could be an amplitude and the system can determine a difference between an amplitude of the responsive light as influenced by the vibrations of the object and an amplitude of the responsive light that is expected when there are no significant defects or discontinuities below the surface region. The vibrations of the object as indicated by the responsive light can similarly be analyzed with respect to a phase or a pulse width of the responsive light and expectations of those characteristics in the absence of the vibrations and/or in the absence of defects or discontinuities under the surface region.

In some examples, the system includes a laser rangefinder configured such that the position and orientation of the rangefinder (e.g., relative to the first laser or the second laser) is known. The rangefinder can be used to determine a distance between the surface region and the rangefinder. That distance, along with the known position and orientation of the rangefinder can be used to determine the position of the surface region within a three-dimensional space (e.g., a rectangular coordinate space, a cylindrical coordinate space, or a spherical coordinate space). As such, the system can store data that associates the determined position of the surface region with characteristics of the responsive light that originates from the surface region. This process can be repeated such that multiple surface regions of the object are analyzed. In this way, structural characteristics of the object can be detected and mapped to three-dimensional space.

The system can also display the surface region(s) of the object such that the difference (e.g., amplitude difference, phase difference, pulse width difference) corresponding to the surface region(s) is indicated at the position of the surface region within the three-dimensional space. For example, increased pixel brightness at the surface region could be a proxy for an increased difference between (i) the amplitude of the responsive light indicative of the vibrations and (ii) the expected amplitude of light detected in the absence of defects under the surface region. Pixel color could also be used in the display to represent larger or smaller differences between the characteristic of the responsive light and the reference characteristic.

The systems and methods disclosed herein can be advantageous because, when compared to conventional systems and methods, the systems and methods disclosed herein can allow for improved detection of structural defects and allow for creating and/or displaying a three dimensional model of an object and the relative locations of those defects.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Referring now to FIG. 1, a system 10 is illustrated. The system 10 includes a computing device 100 and a laser unit 200.

In some examples, components of the computing device 100 illustrated in FIG. 1 are distributed across multiple computing devices. However, for the sake of example, the components are shown and described as part of the computing device 100. The computing device 100 can be or include a mobile device (such as a mobile phone), a desktop computer, a laptop computer, a tablet computer, a server, a network of multiple servers, or similar device(s) that can be configured to perform the functions described herein.

As shown in FIG. 1, the computing device 100 includes one or more processors 102, a non-transitory computer readable medium 104, a communication interface 106, a display 108, and a user interface 110. Components of the computing device 100 illustrated in FIG. 1 are linked together by a system bus, network, or other connection mechanism 112.

The one or more processors 102 can be any type of processor(s), such as a microprocessor, a digital signal processor, a multicore processor, etc., coupled to the non-transitory computer readable medium 104. The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can be configured to store instructions 114. The instructions 114 are executable by the one or more processors 102 to cause the computing device 100 to perform any of the functions described herein. For example, the instructions 114 can include instructions for controlling the laser unit 200 via the communication interface 106.

The communication interface 106 can include hardware to enable communication within the computing device 100 and/or between the computing device 100 and one or more other devices. The hardware can include transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices.

The display 108 can be any type of display component configured to display data. As one example, the display 108 can include a touchscreen display. As another example, the display 108 can include a flat-panel display, such as a liquid-crystal display (LCD) or a light-emitting diode (LED) display.

The user interface 110 can include one or more pieces of hardware used to provide data and control signals to the computing device 100. For instance, the user interface 110 can include a mouse or a pointing device, a keyboard or a keypad, a microphone, a touchpad, or a touchscreen, among other possible types of user input devices. Generally, the user interface 110 can enable an operator to interact with a graphical user interface (GUI) provided by the computing device 100 (e.g., displayed by the display 108).

The laser unit 200 includes a platform 202, a first laser 204, a second laser 206, a rangefinder 208, and a detector 210. Any of the components of the laser unit 200 can be controlled by the computing device 100, as described above.

The first laser 204, the second laser 206, the rangefinder 208, and the detector 210 are mounted on the platform 202. The platform 202 can be attached to or part of a robotic arm (not shown) that is configured to move the first laser 204, the second laser 206, the rangefinder 208, and the detector 210 in unison to various positions and/or orientations. In some examples, one or more of the first laser 204, the second laser 206, the rangefinder 208, and the detector 210 are configured to assume independent orientations and/or positions with respect to the platform 202.

The first laser 204 can take the form of a $CO_2$ laser or a neodymium-doped yttrium aluminum garnet (ND:YAG) laser, but other examples are possible. For example, the first laser 204 can take the form of any light source configured to emit light that is substantially coherent with respect to the oscillation frequency of the light emitted by the first laser 204.

The second laser 206 can take the form of an ND:YAG laser or a superluminescent diode laser, but other examples are possible. For example, the second laser 206 can take the form of any light source configured to emit light that is substantially coherent with respect to the oscillation frequency of the light emitted by the second laser 206.

The rangefinder 208 typically includes a laser and a detector such as a photodetector. For example, the rangefinder 208 is configured to emit a laser beam and determine a distance between a target object and the rangefinder based on the "time of flight" that elapses between emission of the laser beam and detection of its reflection from the target object.

The detector 210 can take the form of a photodetector and/or an interferometer, but other examples are possible.

Figure 5:
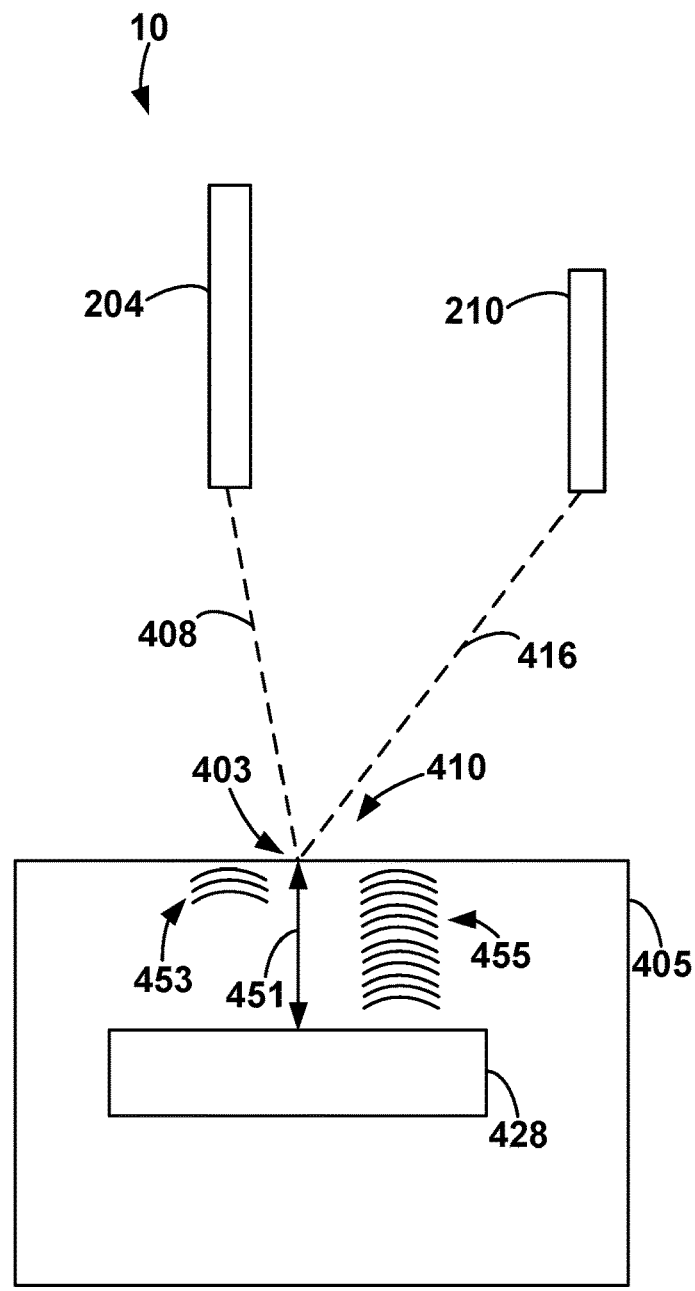
FIG. 5 is a schematic diagram of a system and related functionality for determining structural characteristics of an object, according to an example.
Figure 6:
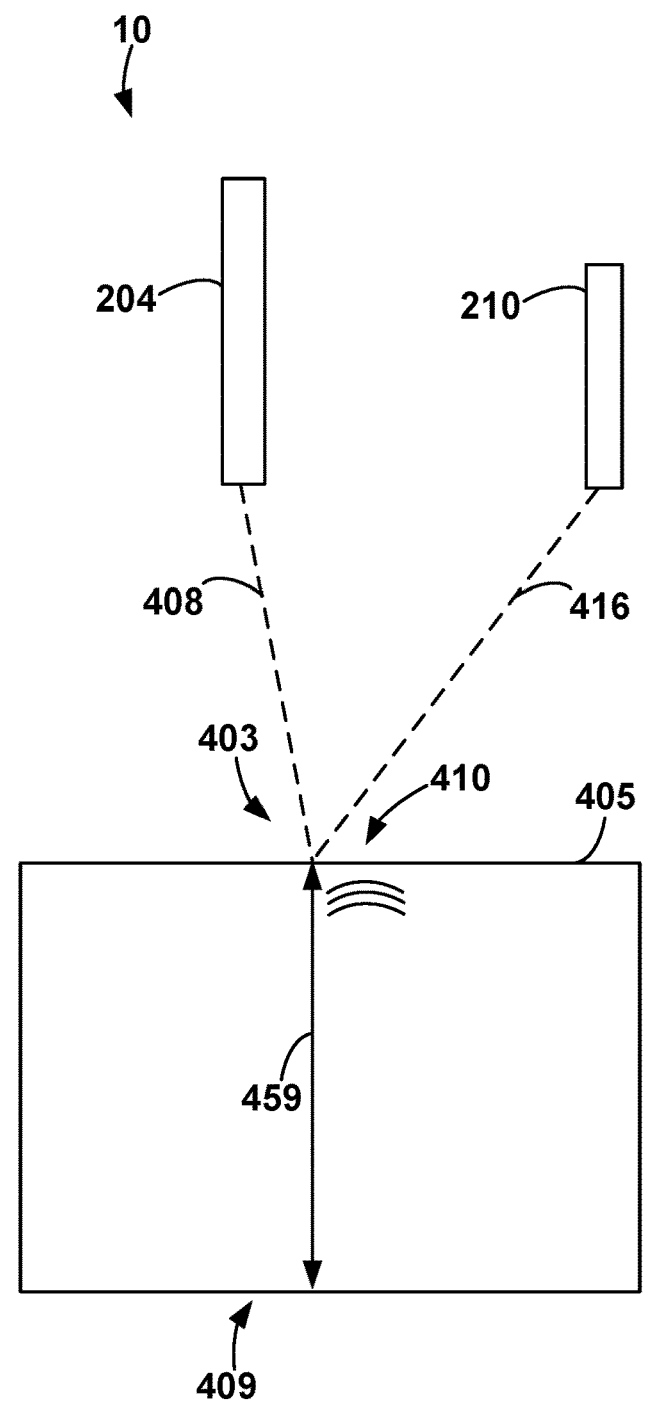
FIG. 6 is a schematic diagram of a system and related functionality for determining structural characteristics of an object, according to an example.
Figure 7:
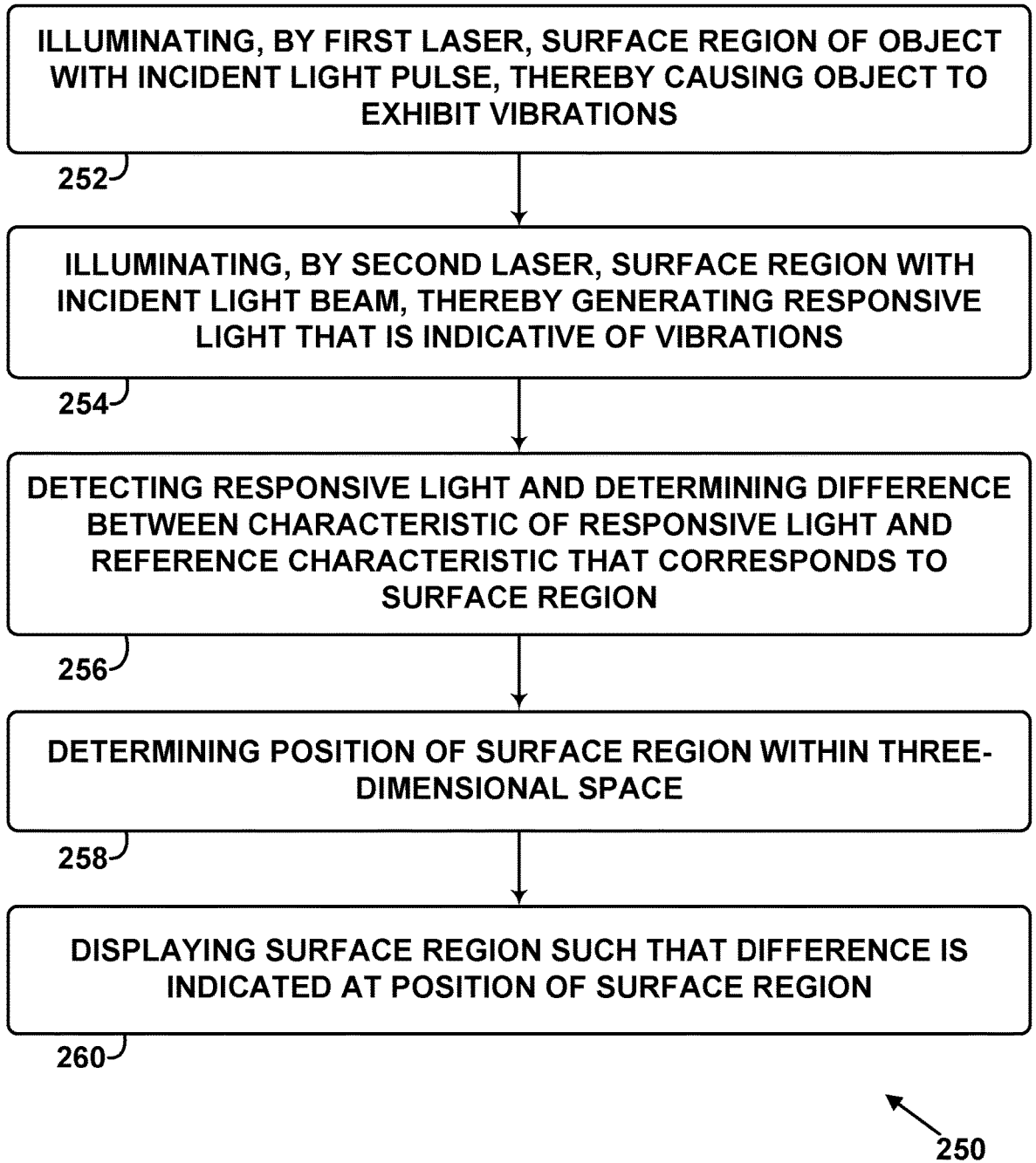
FIG. 7 is a flow chart of a method for determining structural characteristics of an object, according to an example.
Figure 10:
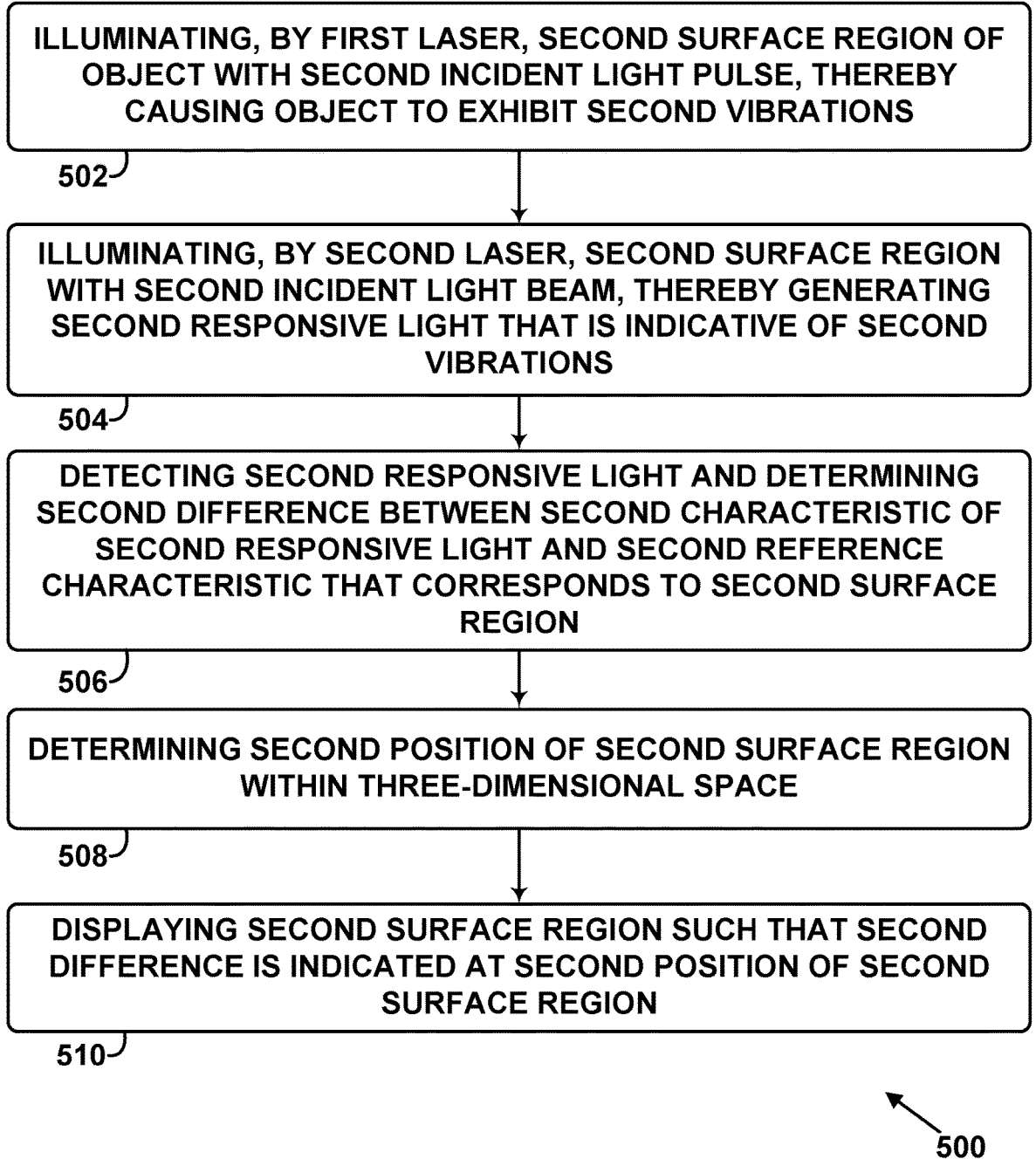
FIG. 10 is a flow chart of a method, according to an example.
Figure 11:
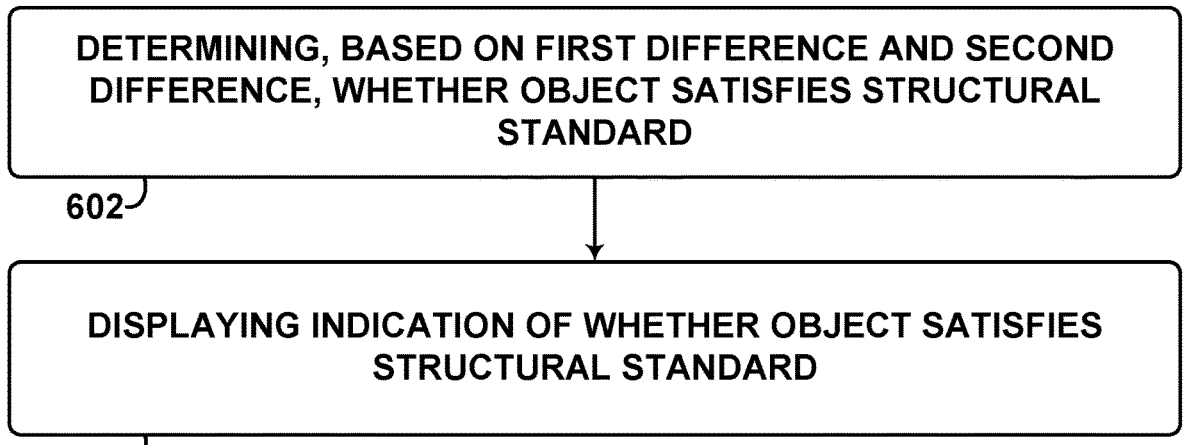
FIG. 11 is a flow chart of a method, according to an example.

FIGS. 2-6 further depict the system 10 and functionality related to the method 250 shown in FIG. 7, the method 300 shown in FIG. 8, the method 400 shown in FIG. 9, the method 500 shown in FIG. 10, and the method 600 shown in FIG. 11.

Figure 2:
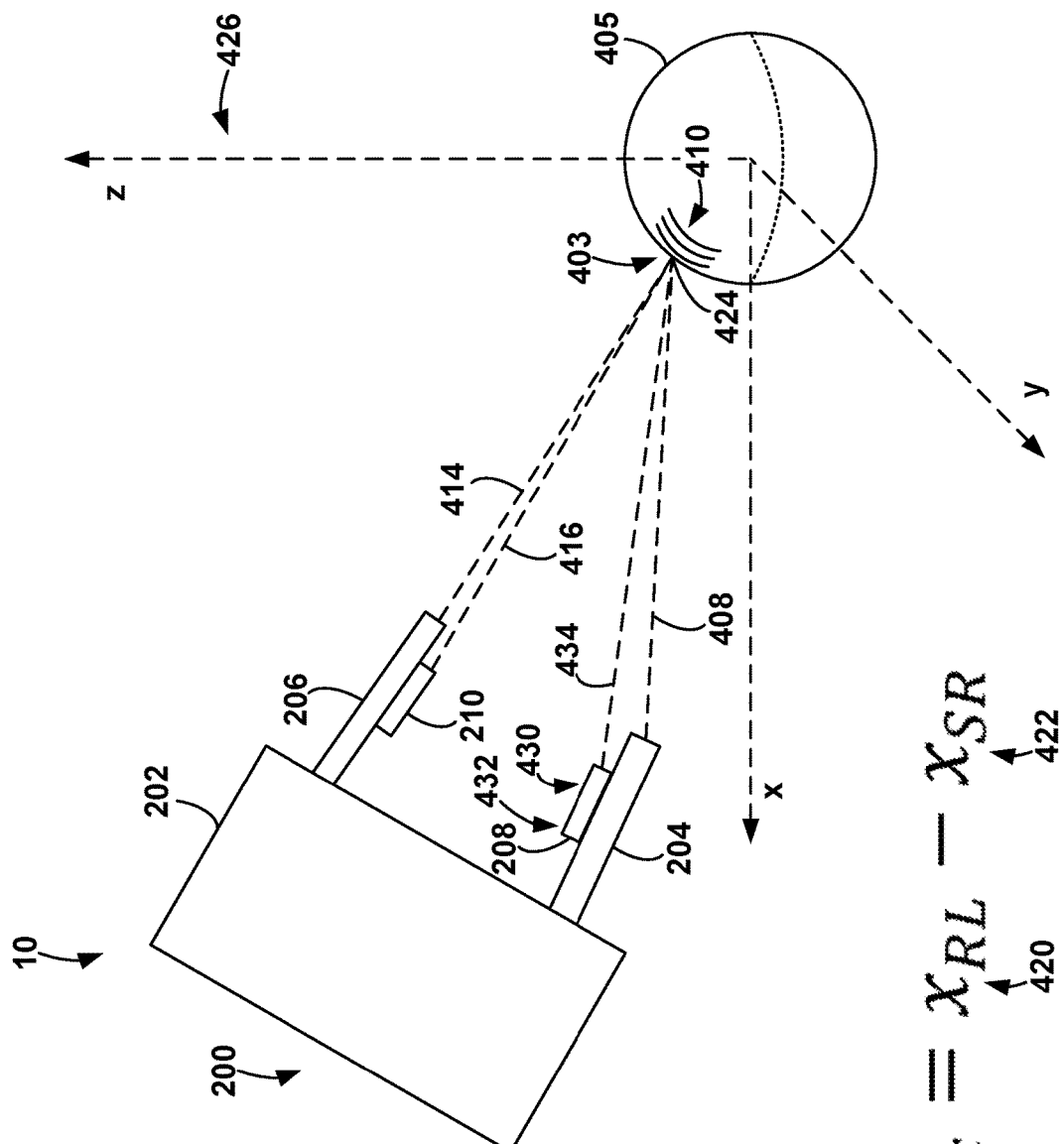
FIG. 2 is a schematic diagram of a system and related functionality for determining structural characteristics of an object, according to an example.

As shown in FIG. 2, the first laser 204 illuminates a surface region 403 of an object 405 with an incident light pulse 408, thereby causing the object 405 to exhibit vibrations 410. As an example, the incident light pulse 408 could have a wavelength ranging from 532 nm to 10.6 µm, an average power ranging from 9 mJ to 11 mJ, and/or a pulse width ranging from 9 ns to 11 ns. In FIG. 2, the object 405 is shown generically as a sphere, but as an example, the object can take the form of an aircraft component (e.g., a wing skin or a tail skin) formed of composite materials. Other examples are possible. The vibrations 410 will generally appear at the surface region 403 upon illumination by the incident light pulse 408, but the vibrations 410 will also generally propagate into the object 405 in a direction normal to the surface region 403. The vibrations 410 will then typically reflect from discontinuities or defects (if any), and/or a back surface of the object 405 and return to the surface region 403.

The second laser 206 also illuminates the surface region 403 with an incident light beam 414, thereby generating responsive light 416 that is indicative of the vibrations 410. Typically, the second laser 206 illuminates the surface region 403 with the incident light beam 414 before, while, and after the first laser 204 illuminates the surface region 403 with the incident light pulse 408. The incident light beam 414 generally does not substantially disturb the object 405. As an example, the incident light beam 414 could have a wavelength substantially equal to 1064 nm and/or an average power ranging from 9 mJ to 13 mJ.

Prior to illumination of the object 405 by the incident light pulse 408, the responsive light 416 generally has a waveform that is similar to that of the incident light beam 414, perhaps having an attenuated amplitude and a substantially constant phase difference when compared to the incident light beam 414. However, the vibrations 410 caused by the incident light pulse 408 will usually influence the responsive light 416 in a detectable manner.

As such, the system 10 determines a difference 418 between a characteristic 420 of the responsive light 416 and a reference characteristic 422 that corresponds to the surface region 403. As shown in FIG. 2, the difference 418 can be equal to the characteristic 420 minus the reference characteristic 422, but in other examples, the difference 418 could be equal to the reference characteristic 422 minus the characteristic 420. As an example, the reference characteristic 422 can be calculated based on an "ideal" model of the object 405 based on a manufacturing specification, for example. In other examples, the reference characteristic 422 can be observed via testing an object that is known to meet a manufacturing specification. Other examples are possible.

For instance, the reference characteristic 422 could be an amplitude and the system 10 can determine the difference 418 between an amplitude of the responsive light 416 as influenced by the vibrations 410 of the object 405 and an amplitude of the responsive light 416 that is expected when there are no significant defects or discontinuities below the surface region 403. In this context, the characteristic 420 being substantially less than the reference characteristic 422 generally indicates that there is a delamination defect, a discontinuity, or a similar defect under the surface region 403 that absorbs some of the acoustic energy of the vibrations 410 that would otherwise travel back to the surface region 403.

As another example, the reference characteristic 422 could be a phase and the system 10 can determine the difference 418 between a phase of the responsive light 416 as influenced by the vibrations 410 of the object 405 and a phase of the responsive light 416 that is expected when there are no significant defects or discontinuities below the surface region 403.

As yet another example, the reference characteristic 422 could be a pulse width and the system 10 can determine the difference 418 between a pulse width of the responsive light 416 as influenced by the vibrations 410 of the object 405 and a pulse width of the responsive light 416 that is expected when there are no significant defects or discontinuities below the surface region 403. In this context, the characteristic 420 being substantially less than the reference characteristic 422 generally indicates that there is a delamination defect, a discontinuity, or a similar defect under the surface region 403 that causes some of the acoustic energy of the vibrations 410 to be reflected back to the surface region 403 before the acoustic energy reaches a back surface of the object 405.

The system 10 also determines a position 424 of the surface region 403 within a three-dimensional space 426 using the rangefinder 208.

In FIG. 2, the rangefinder 208 is affixed to the first laser 204, but the rangefinder 208 could be configured or positioned in any manner in which (i) the position and/or orientation of the rangefinder 208 is ascertainable by the system 10 with respect to the three-dimensional space 426 and (ii) the rangefinder 208 is aligned with the first laser 204 and/or the second laser 206. Other examples are possible.

The system 10 can determine a position 430 and/or an orientation 432 of the rangefinder 208 based on monitoring translations and/or rotations of the platform 202 and/or the rangefinder 208. The system 10 can determine a distance 434 between the rangefinder 208 and the surface region 403 by emitting a laser pulse and determining how long it takes for the laser pulse to reflect from the surface region 403 and return to the rangefinder 208. The system 10 can use the position 430 and/or the orientation 432 and the distance 434 to determine the position 424 of the surface region 403 within the three-dimensional space 426.

In some examples, the system 10 can include multiple rangefinders such as the rangefinder 208. In this context, the system 10 can use the multiple rangefinders and their known positions and/or orientations to determine the position 424 by averaging multiple distances between the surface region 403 and the multiple rangefinders.

The system 10 (e.g., the display 108) also displays the surface region 403 such that the difference 418 is indicated at the position 424 of the surface region 403. For example, the system 10 can display the surface region 403 such that a brightness of the surface region 403 indicates a magnitude and/or sign of the difference 418. That is, increased pixel brightness could correlate with an increased difference 418 or decreased pixel brightness could correlate with an increased difference 418. For example, in a hue, saturation, intensity (HSI) color space a pixel representing the surface region 403 could have an "I" value in the range of 0-0.5 if the difference 418 (e.g., a phase difference) is negative and an "I" value of 0.5-1 if the difference 418 is positive.

In another example, the system 10 can display the surface region 403 such that a color of the surface region 403 is indicative of a magnitude and/or sign of the difference. For example, in a hue, saturation, intensity (HSI) color space a pixel representing the surface region 403 could have an "S" value in the range of 0 to 180 if the difference 418 (e.g., a phase difference) is negative and an "S" value in the range of 180 to 360 if the difference 418 is positive.

Figure 3:
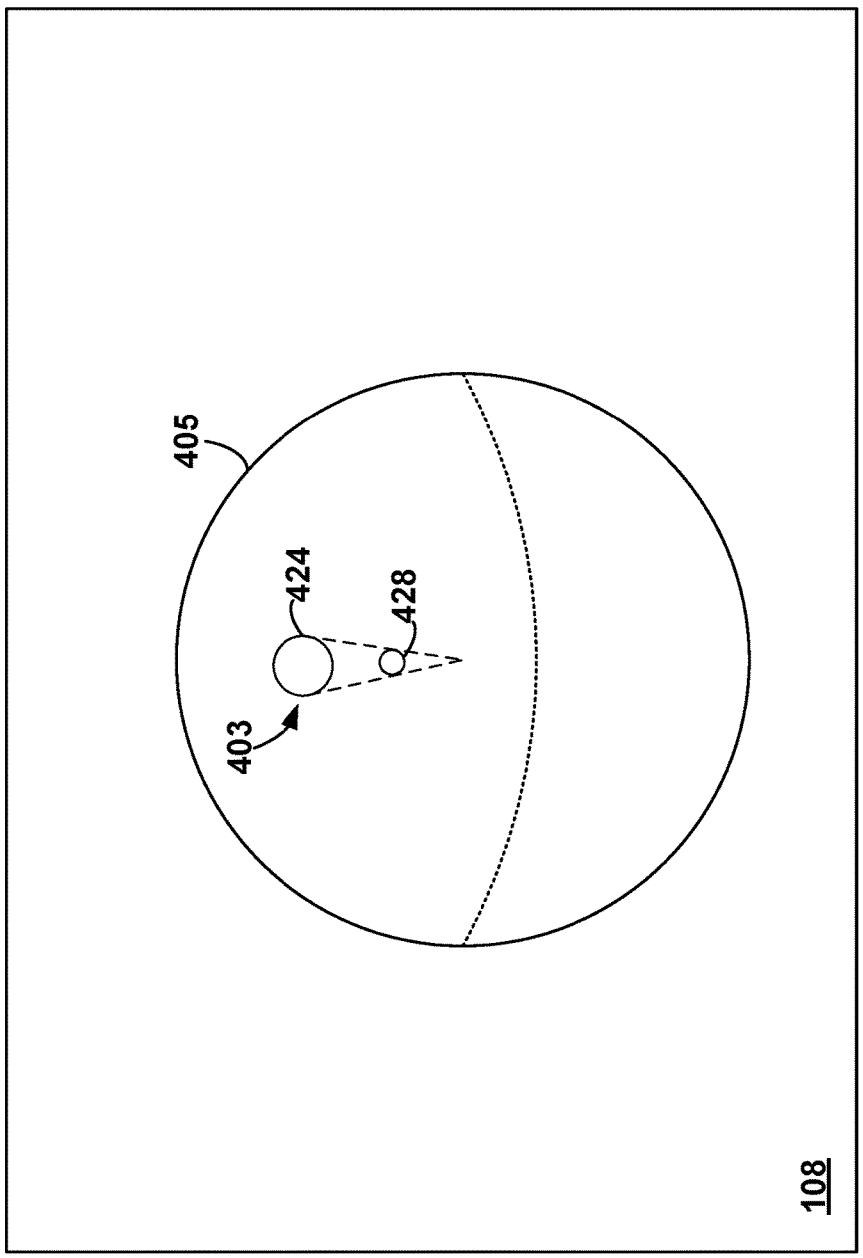
FIG. 3 is a schematic diagram of a display depicting an object under analysis, according to an example.

Referring to FIG. 3, the system 10 can determine, based on the difference 418, that a structural defect 428 exists underneath the surface region 403. For example, the system 10 can determine that the difference 418 (e.g., an amplitude difference, a phase difference, a pulse width difference) or the absolute value of the difference 418 exceeds a threshold value that is perhaps based on a manufacturing specification.

The display 108 of the system 10 can display the structural defect 428 underneath the surface region 403 as shown in FIG. 3, for example, by projecting a virtual and/or semi-transparent three-dimensional version of the object 405 onto the two-dimensional screen of the display 108.

Figure 4:
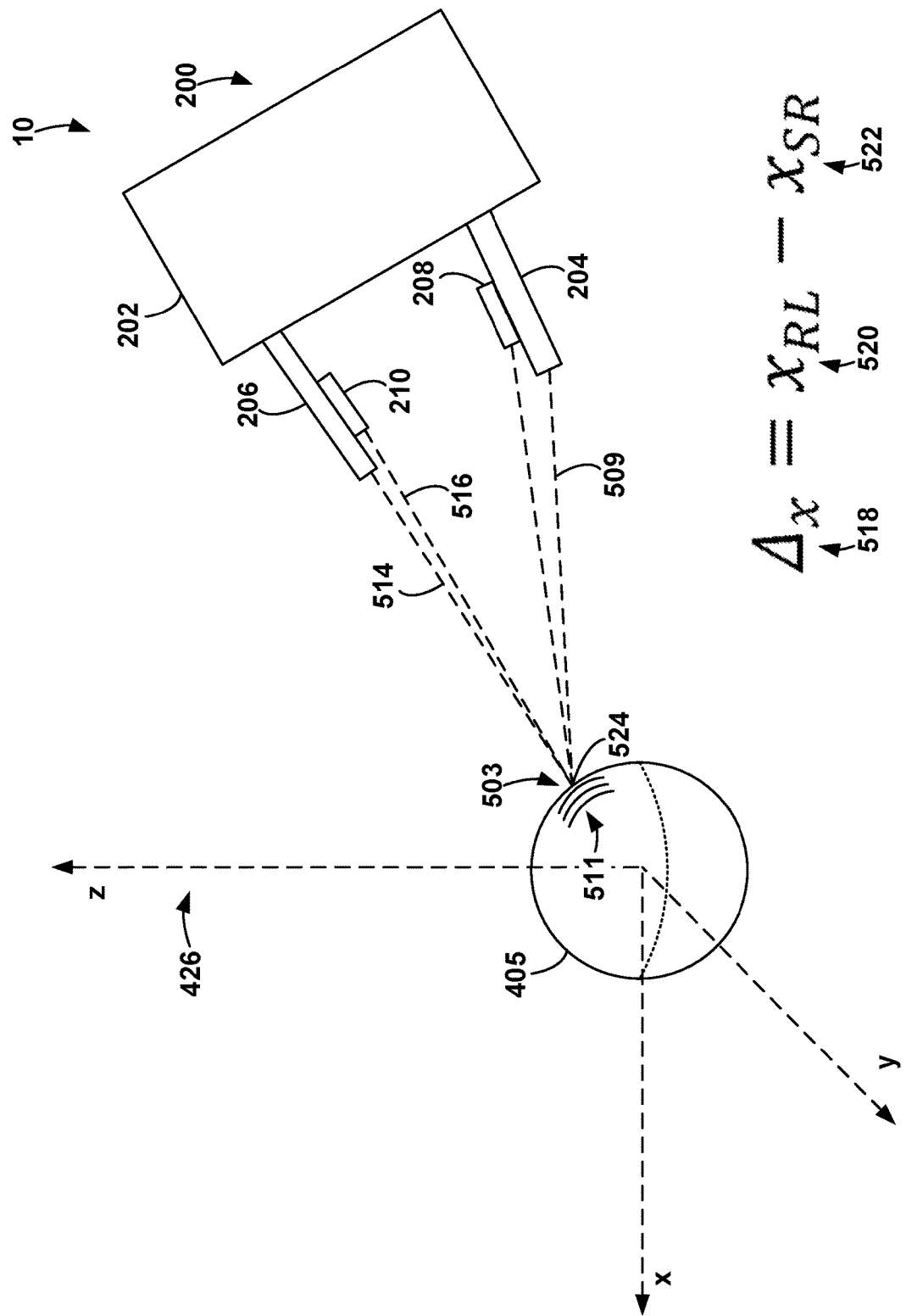
FIG. 4 is a schematic diagram of a system and related functionality for determining structural characteristics of an object, according to an example.

Referring to FIG. 4, the first laser 204 can illuminate a second surface region 503 of the object 405 with a second incident light pulse 509, thereby causing the object 405 to exhibit second vibrations 511. This can be performed in a manner similar to the first laser 204 illuminating the surface region 403, as described above.

The second laser 206 can illuminate the second surface region 503 with a second incident light beam 514, thereby generating second responsive light 516 that is indicative of the second vibrations 511. This can be performed in a manner similar to the second laser 206 illuminating the surface region 403, as described above.

The detector 210 can detect the second responsive light 516 and determine a second difference 518 between a second characteristic 520 of the second responsive light 516 and a second reference characteristic 522 that corresponds to the second surface region 503. This can be performed in a manner similar to the detector 210 detecting the responsive light 416, as described above.

The system 10 can determine a second position 524 of the second surface region 503 within the three-dimensional space 426, which can be performed in a manner similar to the system 10 determining the position 424, as described above.

The display 108 can display the second surface region 503 such that the second difference 518 is indicated at the second position 524 of the second surface region 503, which can be performed in a manner similar to the display 108 displaying the surface region 403, as described above.

In further examples, the system 10 can determine, based on the difference 418 and the second difference 518, whether the object 405 satisfies a structural standard. In some examples, the difference 418 and the second difference 518 are amplitude differences as described above. In other examples, the difference 418 and the second difference 518 are phase differences as described above. In yet other examples, the difference 418 and the second difference 518 are pulse width differences as described above. In some examples, the system 10 can determine differences that correspond to many surface locations of the object 405 and determine that the object meets the structural standard if an average of the differences is less than a threshold amount.

FIG. 5 depicts the system 10 with various components being omitted for the purpose of clarity. As shown in FIG. 5, the vibrations 410 can include a first set of vibrations 453 that are generated upon initial illumination of the surface region 403 by the incident light pulse 408 and a second set of vibrations 455 that travel into the object 405 from the surface region 403 and are reflected back to the surface region 403 (e.g., reflected from the structural defect 428). That is, the first set of vibrations 453 are exhibited at the surface region 403 before the second set of vibrations 455 are exhibited at the surface region 403. In this context, determining the difference 418 between the characteristic 420 of the responsive light 416 and the reference characteristic 422 can include determining a difference between (i) a duration between detecting the responsive light 416 indicative of the first set of vibrations 453 and detecting the responsive light 416 indicative of the second set of vibrations 455 and (ii) a reference duration that corresponds to the surface region 403. As an example, the reference characteristic 422 can be calculated based on an "ideal" model of the object 405 based on a manufacturing specification, for example. In other examples, the reference characteristic 422 can be observed via testing an object that is known to meet a manufacturing specification. Other examples are possible. In this context, the characteristic 420 could be equal to the duration during which the second set of vibrations travels a path 451 (e.g., back and forth) between the surface region 403 and the structural defect 428.

FIG. 6 depicts an example of how the reference characteristic 422 can be determined experimentally. Here, the object 405 is shown without the structural defect 428. Thus, the vibrations 410 travel from the surface region 403, via the path 459, to a back surface 409 of the object 405, and back to the surface region 403. The reference characteristic 422 can be equal to the time it takes for the vibrations 410 to travel the path 459 (e.g., back and forth) in the absence of the structural defect 428. Thus, because of the absence of the structural defect 428, it takes longer for vibrations to travel the path 459 than to travel the path 451. This information can be used to infer that the structural defect 428 is present.

FIGS. 7-11 show flowcharts of the method 250, the method 300, the method 400, the method 500, and the method 600 for determining structural characteristics of an object (e.g., such as the object 405), according to example implementations. The method 250, the method 300, the method 400, the method 500, and the method 600 present examples of methods that could be used with the system 10 shown in FIG. 1 and could be performed with components illustrated in FIG. 1-6. As shown in FIGS. 7-11, the method 250, the method 300, the method 400, the method 500, and the method 600 include one or more operations, functions, or actions as illustrated by blocks 252-260, 302-304, 402-404, 502-510, and 602-604. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 252, the method 250 includes illuminating, by the first laser 204, the surface region 403 of the object 405 with the incident light pulse 408, thereby causing the object 405 to exhibit the vibrations 410. At block 254, the method 250 includes illuminating, by the second laser 206, the surface region 403 with the incident light beam 414, thereby generating the responsive light 416 that is indicative of the vibrations 410. At block 256, the method 250 includes detecting the responsive light 416 and determining the difference 418 between the characteristic 420 of the responsive light 416 and the reference characteristic 422 that corresponds to the surface region 403. At block 258, the method 250 includes determining the position 424 of the surface region 403 within the three-dimensional space 426. At block 260, the method 250 includes displaying the surface region 403 such that the difference 418 is indicated at the position 424 of the surface region 403.

FIG. 8 is a flow chart of the method 300 that can be performed by the system 10 in conjunction with the method 250. Block 302 includes determining the position 430 of the rangefinder 208 or the orientation 432 of the rangefinder 208. Block 304 includes determining the distance 434 between the rangefinder 208 and the surface region 403.

FIG. 9 is a flow chart of the method 400 that can be performed by the system 10 in conjunction with the method 250 or the method 300. At block 402, the method 400 includes determining, based on the difference 418, that the structural defect 428 exists underneath the surface region 403. Block 404 includes displaying the structural defect 428 underneath the surface region 403.

FIG. 10 is a flow chart of the method 500 that can be performed by the system 10 in conjunction with the method 250, the method 300, or the method 400. Block 502 includes illuminating, by the first laser 204, the second surface region 503 of the object 405 with the second incident light pulse 509, thereby causing the object 405 to exhibit the second vibrations 511. Block 504 includes illuminating, by the second laser 206, the second surface region 503 with the second incident light beam 514, thereby generating the second responsive light 516 that is indicative of the second vibrations 511. Block 506 includes detecting the second responsive light 516 and determining the second difference 518 between the second characteristic 520 of the second responsive light 516 and the second reference characteristic 522 that corresponds to the second surface region 503. Block 508 includes determining the second position 524 of the second surface region 503 within the three-dimensional space 426. Block 510 includes displaying the second surface region 503 such that the second difference 518 is indicated at the second position 524 of the second surface region 503.

FIG. 11 is a flow chart of the method 600 that can be performed by the system 10 in conjunction with the method 250, the method 300, the method 400, or the method 500. At block 602, the method 600 includes determining, based on the difference 418 and the second difference 518, whether the object 405 satisfies a structural standard. At block 604, the method 600 includes displaying an indication of whether the object 405 satisfies the structural standard.

Examples of the present disclosure can thus relate to one of the enumerated clauses (EC) listed below.

EC 1 is a method for determining structural characteristics of an object, the method comprising: illuminating, by a first laser, a surface region of an object with an incident light pulse, thereby causing the object to exhibit vibrations; illuminating, by a second laser, the surface region with an incident light beam, thereby generating responsive light that is indicative of the vibrations; detecting the responsive light and determining a difference between a characteristic of the responsive light and a reference characteristic that corresponds to the surface region; determining a position of the surface region within a three-dimensional space; and displaying the surface region such that the difference is indicated at the position of the surface region.

EC 2 is the method of EC 1, wherein determining the position comprises determining the position using a rangefinder.

EC 3 is the method of EC 2, further comprising: determining a position of the rangefinder or an orientation of the rangefinder; and determining a distance between the rangefinder and the surface region, wherein determining the position of the surface region comprises using (i) the position of the rangefinder and/or the orientation and (ii) the distance to determine the position of the surface region.

EC 4 is the method of any of ECs 1-3, wherein determining the difference between the characteristic of the responsive light and the reference characteristic comprises determining a difference between an amplitude of the responsive light and a reference amplitude that corresponds to the surface region.

EC 5 is the method of any of ECs 1-3, wherein determining the difference between the characteristic of the responsive light and the reference characteristic comprises determining a difference between a phase of the responsive light and a reference phase that corresponds to the surface region.

EC 6 is the method of any of ECs 1-3, wherein the vibrations comprise a first set of vibrations that are generated upon initial illumination of the surface region by the incident light pulse and a second set of vibrations that travel into the object from the surface region and are reflected back to the surface region, and wherein determining the difference between the characteristic of the responsive light and the reference characteristic comprises determining a difference between (i) a duration between detecting the responsive light indicative of the first set of vibrations and detecting the responsive light indicative of the second set of vibrations and (ii) a reference duration that corresponds to the surface region.

EC 7 is the method of any of ECs 1-6, wherein displaying the surface region comprises displaying the surface region such that a brightness of the surface region indicates a magnitude of the difference.

EC 8 is the method of any of ECs 1-6, wherein displaying the surface region comprises displaying the surface region such that a color of the surface region indicates a magnitude of the difference.

EC 9 is the method of any of ECs 1-8, further comprising: determining, based on the difference, that a structural defect exists underneath the surface region; and displaying the structural defect underneath the surface region.

EC 10 is the method of any of ECs 1-9, wherein the surface region is a first surface region, the vibrations are first vibrations, the responsive light is first responsive light, the position is a first position, the incident light pulse is a first incident light pulse, the incident light beam is a first incident light beam, and the difference is a first difference, the method further comprising: illuminating, by the first laser, a second surface region of the object with a second incident light pulse, thereby causing the object to exhibit second vibrations; illuminating, by the second laser, the second surface region with a second incident light beam, thereby generating second responsive light that is indicative of the second vibrations; detecting the second responsive light and determining a second difference between a second characteristic of the second responsive light and a second reference characteristic that corresponds to the second surface region; determining a second position of the second surface region within the three-dimensional space; and displaying the second surface region such that the second difference is indicated at the second position of the second surface region.

EC 11 is the method of EC 10, further comprising: determining, based on the first difference and the second difference, whether the object satisfies a structural standard; and displaying an indication of whether the object satisfies the structural standard.

EC 12 is the method of EC 11, wherein determining the first difference comprises determining a difference between an amplitude of the first responsive light and a reference amplitude that corresponds to the first surface region, wherein determining the second difference comprises determining a difference between an amplitude of the second responsive light and a reference amplitude that corresponds to the second surface region.

EC 13 is the method of EC 11, further comprising: wherein determining the first difference comprises determining a difference between a phase of the first responsive light and a reference phase that corresponds to the first surface region, wherein determining the second difference comprises determining a difference between a phase of the second responsive light and a reference phase that corresponds to the second surface region.

EC 14 is the method of any of ECs 1-14, wherein illuminating the surface region of the object comprises illuminating a surface region of an object formed of a composite material.

EC 15 is a non-transitory computer readable medium storing instructions that, when executed by a system for determining structural characteristics of an object, cause the system to perform functions comprising: illuminating, by a first laser, a surface region of an object with an incident light pulse, thereby causing the object to exhibit vibrations; illuminating, by a second laser, the surface region with an incident light beam, thereby generating responsive light that is indicative of the vibrations; detecting the responsive light and determining a difference between a characteristic of the responsive light and a reference characteristic that corresponds to the surface region; determining a position of the surface region within a three-dimensional space; and displaying the surface region such that the difference is indicated at the position of the surface region.

EC 16 is the non-transitory computer readable medium of EC 15, the functions further comprising: determining a position of a rangefinder or an orientation of the rangefinder; and determining a distance between the rangefinder and the surface region, wherein determining the position of the surface region comprises using (i) the position of the rangefinder or the orientation and (ii) the distance to determine the position of the surface region.

EC 17 is a system for determining structural characteristics of an object, the system comprising: a first laser; a second laser; one or more processors; and a computer readable medium storing instructions that, when executed by the one or more processors, cause the system to perform functions comprising: illuminating, by the first laser, a surface region of an object with an incident light pulse, thereby causing the object to exhibit vibrations; illuminating, by the second laser, the surface region with an incident light beam, thereby generating responsive light that is indicative of the vibrations; detecting the responsive light and determining a difference between a characteristic of the responsive light and a reference characteristic that corresponds to the surface region; determining a position of the surface region within a three-dimensional space; and displaying the surface region such that the difference is indicated at the position of the surface region.

EC 18 is the system of EC 17, the functions further comprising: determining, based on the difference, that a structural defect exists underneath the surface region; and displaying the structural defect underneath the surface region.

EC 19 is the system of any of ECs 17-18, wherein determining the difference between the characteristic of the responsive light and the reference characteristic comprises determining a difference between an amplitude of the responsive light and a reference amplitude that corresponds to the surface region.

EC 20 is the system of any of ECs 17-19, wherein the vibrations comprise a first set of vibrations that are generated upon initial illumination of the surface region by the incident light pulse and a second set of vibrations that travel into the object from the surface region and are reflected back to the surface region, and wherein determining the difference between the characteristic of the responsive light and the reference characteristic comprises determining a difference between (i) a first duration between detecting the responsive light indicative of the first set of vibrations and detecting the responsive light indicative of the second set of vibrations and (ii) a reference duration that corresponds to the surface region.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A method for determining structural characteristics of an object, the method comprising:
    moving a first laser, a second laser, a rangefinder, and a detector in unison;
    illuminating, by the first laser, a surface region of an object with an incident light pulse, thereby causing the object to exhibit vibrations;
    illuminating, by the second laser, the surface region with an incident light beam, thereby generating responsive light that is indicative of the vibrations;
    detecting, via the detector, the responsive light and determining a difference between a characteristic of the responsive light and a reference characteristic that corresponds to the surface region;
    determining a position of the surface region within a three-dimensional space using the rangefinder; and
    displaying the surface region such that the difference is indicated at the position of the surface region.

2. The method of claim 1, further comprising:
    determining a position of the rangefinder or an orientation of the rangefinder; and
    determining a distance between the rangefinder and the surface region,
    wherein determining the position of the surface region comprises using (i) the position of the rangefinder and/or the orientation and (ii) the distance to determine the position of the surface region.

3. The method of claim 1, wherein determining the difference between the characteristic of the responsive light and the reference characteristic comprises determining a difference between an amplitude of the responsive light and a reference amplitude that corresponds to the surface region.

4. The method of claim 1, wherein determining the difference between the characteristic of the responsive light and the reference characteristic comprises determining a difference between a phase of the responsive light and a reference phase that corresponds to the surface region.

5. The method of claim 1,
    wherein the vibrations comprise a first set of vibrations that are generated upon initial illumination of the surface region by the incident light pulse and a second set of vibrations that travel into the object from the surface region and are reflected back to the surface region, and
    wherein determining the difference between the characteristic of the responsive light and the reference characteristic comprises determining a difference between (i) a duration between detecting the responsive light indicative of the first set of vibrations and detecting the responsive light indicative of the second set of vibrations and (ii) a reference duration that corresponds to the surface region.

6. The method of claim 1, wherein displaying the surface region comprises displaying the surface region such that a brightness of the surface region indicates a magnitude of the difference.

7. The method of claim 1, further comprising:
    determining, based on the difference, that a structural defect exists underneath the surface region; and
    displaying the structural defect underneath the surface region.

8. The method of claim 1, wherein the surface region is a first surface region, the vibrations are first vibrations, the responsive light is first responsive light, the position is a first position, the incident light pulse is a first incident light pulse, the incident light beam is a first incident light beam, and the difference is a first difference, the method further comprising:
    illuminating, by the first laser, a second surface region of the object with a second incident light pulse, thereby causing the object to exhibit second vibrations;
    illuminating, by the second laser, the second surface region with a second incident light beam, thereby generating second responsive light that is indicative of the second vibrations;
    detecting the second responsive light and determining a second difference between a second characteristic of the second responsive light and a second reference characteristic that corresponds to the second surface region;
    determining a second position of the second surface region within the three-dimensional space; and
    displaying the second surface region such that the second difference is indicated at the second position of the second surface region.

9. The method of claim 8, wherein displaying the surface region comprises displaying the surface region to indicate a magnitude of the difference.

10. The method of claim 8, wherein displaying the surface region comprises displaying the surface region to indicate a sign of the difference.

11. The method of claim 8, further comprising:
    determining, based on the first difference and the second difference, whether the object satisfies a structural standard; and
    displaying an indication of whether the object satisfies the structural standard.

12. The method of claim 11,
    wherein determining the first difference comprises determining a difference between an amplitude of the first responsive light and a reference amplitude that corresponds to the first surface region,
    wherein determining the second difference comprises determining a difference between an amplitude of the second responsive light and a reference amplitude that corresponds to the second surface region.

13. The method of claim 1, wherein illuminating the surface region of the object comprises illuminating a surface region of an object formed of a composite material.

14. A non-transitory computer readable medium storing instructions that, when executed by a system for determining structural characteristics of an object, cause the system to perform functions comprising:
   moving a first laser, a second laser, a rangefinder, and a detector in unison;
   illuminating, by the first laser, a surface region of an object with an incident light pulse, thereby causing the object to exhibit vibrations;
   illuminating, by the second laser, the surface region with an incident light beam, thereby generating responsive light that is indicative of the vibrations;
   detecting, via the detector, the responsive light and determining a difference between a characteristic of the responsive light and a reference characteristic that corresponds to the surface region;
   determining a position of the surface region within a three-dimensional space using the rangefinder; and
   displaying the surface region such that the difference is indicated at the position of the surface region.

15. The non-transitory computer readable medium of claim 14, the functions further comprising:
   determining a position of the rangefinder or an orientation of the rangefinder; and
   determining a distance between the rangefinder and the surface region,
   wherein determining the position of the surface region comprises using (i) the position of the rangefinder and/or the orientation and (ii) the distance to determine the position of the surface region.

16. A system for determining structural characteristics of an object, the system comprising:
   a first laser;
   a second laser;
   a rangefinder;
   a detector;
   one or more processors; and
   a computer readable medium storing instructions that, when executed by the one or more processors, cause the system to perform functions comprising:
      moving the first laser, the second laser, the rangefinder, and the detector in unison;
      illuminating, by the first laser, a surface region of an object with an incident light pulse, thereby causing the object to exhibit vibrations;
      illuminating, by the second laser, the surface region with an incident light beam, thereby generating responsive light that is indicative of the vibrations;
      detecting, via the detector, the responsive light and determining a difference between a characteristic of the responsive light and a reference characteristic that corresponds to the surface region;
      determining a position of the surface region within a three-dimensional space using the rangefinder; and
      displaying the surface region such that the difference is indicated at the position of the surface region.

17. The system of claim 16, the functions further comprising:
   determining, based on the difference, that a structural defect exists underneath the surface region; and
   displaying the structural defect underneath the surface region.

18. The system of claim 16, wherein determining the difference between the characteristic of the responsive light and the reference characteristic comprises determining a difference between an amplitude of the responsive light and a reference amplitude that corresponds to the surface region.

19. The system of claim 16,
   wherein the vibrations comprise a first set of vibrations that are generated upon initial illumination of the surface region by the incident light pulse and a second set of vibrations that travel into the object from the surface region and are reflected back to the surface region, and
   wherein determining the difference between the characteristic of the responsive light and the reference characteristic comprises determining a difference between (i) a first duration between detecting the responsive light indicative of the first set of vibrations and detecting the responsive light indicative of the second set of vibrations and (ii) a reference duration that corresponds to the surface region.

20. The system of claim 16, the functions further comprising:
   determining a position of the rangefinder or an orientation of the rangefinder; and
   determining a distance between the rangefinder and the surface region,
   wherein determining the position of the surface region comprises using (i) the position of the rangefinder and/or the orientation and (ii) the distance to determine the position of the surface region.

* * * * *